Jan. 26, 1954   D. W. DUNIPACE ET AL   2,667,018
GRINDING AND POLISHING GLASS SHEETS AND PLATES
Filed June 3, 1949                                    2 Sheets-Sheet 1

Inventors
Donald W. Dunipace
and Ival G. Fowler
By Nobbe & Swope
Attorneys

Jan. 26, 1954  D. W. DUNIPACE ET AL  2,667,018
GRINDING AND POLISHING GLASS SHEETS AND PLATES
Filed June 3, 1949  2 Sheets-Sheet 2
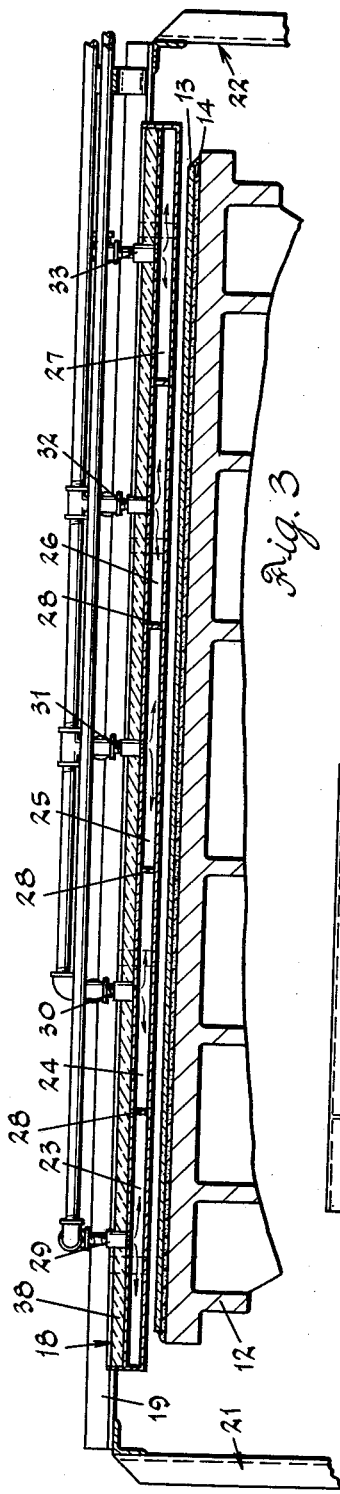
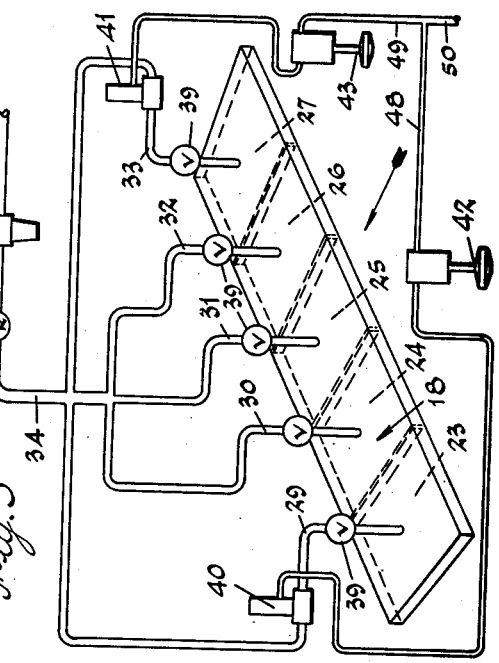
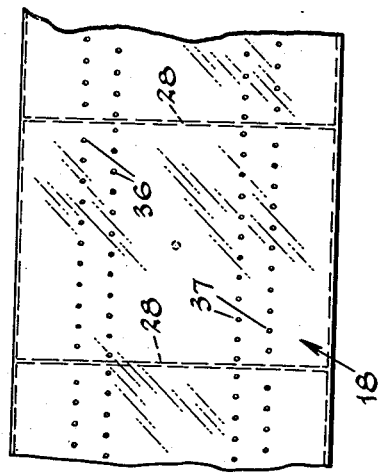
Inventors
Donald W. Dunipace
and Ival G. Fowler
By Nobbe & Swope
Attorneys Patented Jan. 26, 1954

2,667,018

UNITED STATES PATENT OFFICE 2,667,018

GRINDING AND POLISHING GLASS SHEETS AND PLATES

Donald W. Dunipace, Perrysburg, and Ival G. Fowler, Toledo, Ohio, assignors to Libbey-Owens-Ford Glass Company, Toledo, Ohio, a corporation of Ohio Application June 3, 1949, Serial No. 96,922

11 Claims. (Cl. 51—277)

The present invention relates broadly to the grinding and polishing of glass, and more particularly to a method and apparatus for treating plate glass blanks, during laying, in a manner to permit them to be secured to the tables on which they are to be ground and polished in a flat, unstrained condition.

The problem of distortion in ground and polished plate glass has been a very serious one. To the layman this will seem surprising because, in grinding and polishing glass, the top surface of the plate glass blank is first ground down until it is flat and then polished. Following this, the blank is turned over and the other side is ground flat and then polished. Theoretically, this should give a glass plate that is perfectly flat and which has opposite surfaces that are parallel throughout their area.

However, this is not what happens in actual practice. Instead, commercially ground and polished plate glass always exhibits wedge, that is variation from parallelism between opposite surfaces, particularly at the marginal portions of the plate, and also some curvature, or variation from flatness.

This does not mean that such wedge or curvature is of sufficient magnitude to be visible to the naked eye, or to the casual observer, but even a variation from parallelism of 5 minutes is sufficient to give an objectionable object displacement, or an objectionable double image effect when such wedged glass is used as a windshield in an automobile, for example.

Thus, "curling" of only 1/128 of an inch in the blank when bedded in the plaster on the grinding and polishing table has been found to result in a wedge of 5 minutes or more in parts of the finished plate glass, and the image of a bright object viewed through a plate of glass, having this amount of wedge, at 1000 feet will have its image displaced almost a foot from the actual position of the object, or will give a double image with the main and ghost images being over five feet apart.

Now, we have discovered that a major factor in the production of wedge, and curvature or waviness, in commercially ground and polished plate glass is due to the fact that the glass blanks do not lie flat on the tables during grinding and polishing and, more specifically, that their failure to lie flat, particularly at their marginal portions, is due to a large extent to differentials in temperature between their top and bottom surfaces, which cause the blanks to bow or curl at their edges.

Since this bowing or curling takes place at the time that the plaster of Paris, or similar material by which the glass blanks are secured to the tables, is setting up, the blanks will be firmly secured and held in bowed or curled condition. Moreover, as the temperatures of the opposite surfaces of the blank is subsequently equalized by the grinding and polishing action they will tend to straighten or flatten out, but will be unable to do so because of the restraining action of the plaster in which they are bedded or set. Consequently, mechanical strains will be set up in the blanks which may result in breakage under the weight of the surfacing tools.

In addition, the curled edges of the blank may strike the grinding tools in a manner to cause chipping or breaking of the glass edges. But, most important of all, because the upper surface of the blank is ground flat while being restrained in a bowed shape, it will be found that when the blank is subsequently released from the plaster it will spring back to its original shape, and that the ground and polished upper surface thereof is then not flat at all.

Furthermore, since the blank must subsequently be turned over and have its second surface ground and polished, under the same conditions as the first surface, it will be found that the amount of wedge and curvature in the border regions, resulting from the grinding and polishing of the first side will have been increased by a similar amount when the second side has been ground and polished.

It is therefore the primary object of the present invention to reduce the amount of wedge and curvature in ground and polished plate glass by treating the glass blanks, while they are being laid on the tables, preliminary to grinding and polishing, in a manner to cause them to lie flat and to be embedded in the plaster in that condition.

Another object is to cause the glass blanks to lie flat on the grinding and polishing tables by equalizing the temperatures of the opposite surfaces of the blanks while they are being laid on the tables and embedded in the plaster.

Another object is to heat the upper surface of a glass blank which has been laid on a heated table while the blank itself is relatively cold, to raise the temperature of the upper surface of the blank to substantially that of the lower surface which is in contact with the heated table.

Another object is the provision of a steam pan or pans for heating the upper surface of a glass blank while it is being laid on and secured to a grinding and polishing table.

Another object is to provide an apparatus for heating the surface of a plate glass blank under such conditions by the condensation of live steam on the glass surface.

Still another object is the provision of means for heating the upper surface of a glass blank on a grinding and polishing table, and of control means for accurately regulating the amount of heat applied to various areas of the surface and, in some instances, for heating the entire upper surface uniformly.

Other objects and advantages of the invention will become more apparent during the course of the following description, when taken in connection with the accompanying drawings.

In the drawings, wherein like numerals are employed to designate like parts throughout the same:

Fig. 3 is a transverse vertical section through the steam heating pan and one of the tables in the laying yard, taken substantially along the line 3—3 in Fig. 2;

Fig. 4 is a bottom view of the steam heating pan;

Fig. 5 is a schematic view of the steam pan, showing the steam conduits and control means therefore; and, Fig. 6 is a schematic view of a glass blank that has curled on the grinding and polishing table, and is held in this condition by the plaster.

Figure 1:
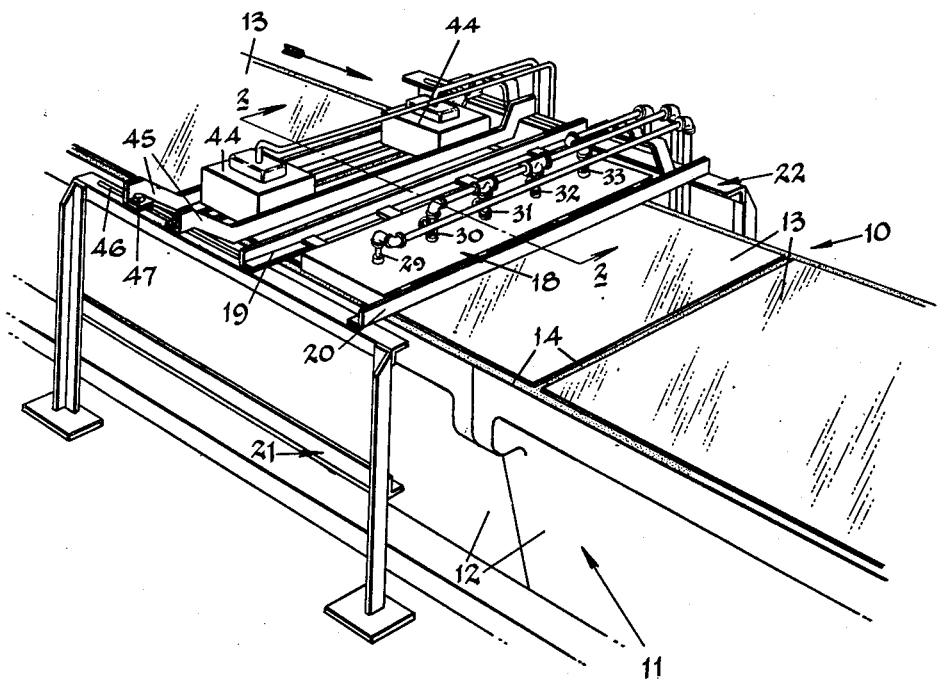
Fig. 1 is a fragmentary perspective view showing the laying yard of a continuous grinding and polishing system or line.

Referring now more particularly to the drawings, there is illustrated in Fig. 1 one end of the laying yard 10 of a continuous grinding and polishing line, which is indicated in its entirety by the numeral 11. Although in no way restricted to use with any particular form of grinding or polishing mechanism, the present invention has proved to be of outstanding commercial value when employed in connection with the grinding and polishing of glass on a so-called continuous system.

Generally speaking, in such a continuous system a series of cars or tables 12 are arranged in end-to-end relation and are moved continuously along a definite horizontal path in which they are carried, from the laying yard 10, first beneath a series of grinding units, and then beneath a series of polishing units (not shown), and finally returned to the laying yard.

The term "laying yard" as used in this application is intended to mean that portion of a continuous grinding and polishing system, located in advance of the grinding units, in which the glass sheets to be ground and polished are laid on, and secured to, the upper surfaces of the cars or tables in the line.

Within the forward end of the laying yard 10 (not shown) glass blanks 13 to be ground and polished are laid successively end to end upon the tops of the moving cars or tables 12 in slightly spaced end-to-end relation, and it is customary to secure the blanks upon the tables by embedding them in a layer of plaster of Paris or the like 14.

The plaster for this purpose is ordinarily mixed with water and then poured, sprayed or otherwise applied to the tops of the moving cars or tables 12. The glass sheets 13 are laid upon this layer of wet plaster and are then pressed downwardly thereinto, usually by rolling pressure applied to the upper surfaces of the blanks. As the plaster sets up, the blanks will be firmly embedded in the plaster and tightly secured to the tables thereby.

However, as indicated above, we have found that in the procedure heretofore generally practiced, the blanks actually curl up at the edges after they have been laid on the tables, and that the quick-setting plaster acts to hold them to the tables in this curled condition. We have also found that the grinding of the glass blanks while held in this way is responsible for a great deal of the distortion which is found in ground and polished plate glass, particularly in the marginal and adjacent portions of the plate.

The reason for this is that the tables 12 upon which the blanks 13 are to be laid are still at an elevated temperature from their previous trip through the grinding and polishing areas of the line 11 so that they come into the entrance end of the laying yard 10 at temperatures from 95 degrees to 110 degrees Fahrenheit. The glass blanks 13, on the other hand, are at normal room temperature which varies from 65 degrees to 80 degrees depending on the outside temperature.

Consequently, when the relatively cool blanks are laid on the relatively hot tables the lower surface of the blank will become heated by conduction from the table top but, because glass is a poor conductor of heat, the top surface of the blank will remain relatively cool. Because of this, the warm lower surface of the glass expands and tries to become longer than the cooler upper surface with the result that the sheet tends to bend or warp upwardly into a concave shape. However, the weight of the body of the blank, especially in the case of relatively thin blanks of large surface area, is sufficient to cause the greater part of the central area of the blank to sag practically onto the tables. But this only accentuates the upward warping or curling at the margins, due to the closer proximity of the under surface to the heated table.

Figure 6:
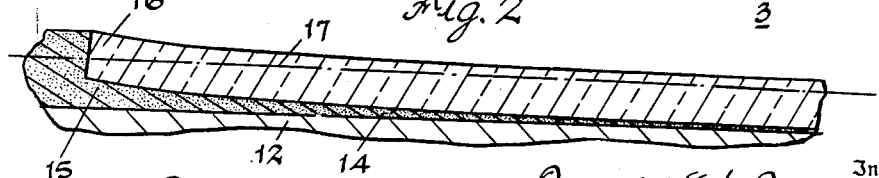

Since the curling of the blank takes place for the most part immediately after it has been laid on the table, the blank will be in this condition while it is being embedded in the plaster and during the time that the plaster is setting up, with the result that the plaster will fill the space 15 between the warped portions of the blank and the tables 12 and upon setting will maintain the glass in warped condition as shown in greatly exaggerated form in Fig. 6. This warp will remain even after the top surface of the glass finally arrives at the same temperature as the lower surface because the set plaster will prevent the glass from returning to its normally flat condition and, in addition, this restraint will set up mechanical strains in the blank that may cause breakage.

The protruding corners 16 are also objectionable because of the likelihood of breakage when they contact the grinding runners. Another bad feature is that it is necessary to grind the warped blank down to approximately the level of the broken line 17 in Fig. 6, in order to grind the upper surface flat, and this requires the grinding away of a larger amount of glass than would be necessary if the blank were not curled.

Also, after the upper surface of the blank has been ground, it is necessary to remove the blank from the table and return it to the laying yard to await its turn in being relaid on the line to grind and polish the second surface. By the time the blank is ready to be relaid for surfacing the second side, it will have approached room temperature again, so that it will once more curl during relaying, with the result that similar conditions will prevail for grinding the second surface as for grinding the first, and the amount of distortion resulting from this condition in grinding one side will be theoretically doubled in the border regions in grinding both sides.

As explained above, the showing of Fig. 6 is greatly exaggerated, but we have determined by optical testing that glass blanks laid according to previous practice may curl as much as $1/64$ of an inch due to normal temperature differentials between the upper and lower surfaces of the blank, and that the grinding and polishing of a blank while held in this curled condition may produce as much as 12 minutes of wedge in finished plates which have been ground and polished on both sides.

It should be understood that wedge in flat glass is a condition resulting from a variation from parallelism between the opposite surface of a glass sheet or plate. Or, differently expressed, "wedge" is the measure of the angle through which a plane parallel to the plane through one face of the plate must be rotated to make that plane parallel to the plane through the other face.

Wedge in a plate of glass causes two principal objectionable conditions, from an optical standpoint, when the plate is put to normal use. That is, primary deviation, and double image.

"Primary deviation" is the apparent displacement of an object viewed through a piece of wedged glass, and by "angle of primary deviation" is meant the angle between the original direction of a light beam projected through the piece of wedged glass and the deviated direction to which the beam is bent in passing through the glass.

"Double image" is an optical phenomenon brought about, when a bright object is viewed through a wedged plate of glass, by the fact that a secondary image is reflected at both surfaces in addition to being refracted by both glass surfaces. This secondary or ghost image is dimmer than the primary or main image, and the displacement is greater. The "angle of double image displacement" may be expressed as the angle, at the glass, between a line passing through the primary image and a line passing through the secondary image.

Now a wedge of approximately 12 minutes in a plate of glass will result in an angle of primary deviation of 6.3 minutes and a displacement of the image of an object 1000 feet away of nearly two feet. In other words, an object viewed through glass having a 12 minute wedge will appear to be almost two feet away from where it actually is.

Similarly, a wedge of approximately 12 minutes will result in a angle of double image displacement of 36.5 minutes and a double image displacement of nearly 10 feet of an object 1000 feet distant. That is to say, an observer viewing a bright object 1000 feet away through a plate of glass having a 12 minute wedge will see a main image and a ghost image that appear to be almost 10 feet apart.

According to the present invention, warpage of the sheet during laying is substantially eliminated, and the distortion in ground and polished plate glass due to wedge and waves, is materially reduced, by equalizing the temperatures of the top and bottom surfaces of the glass during the laying procedure, and so causing the blank to lie flat on the tables while the plaster is setting up. Preferably, this is accomplished by heating the upper surface of the blank after it has been placed on the tables, and while the plaster is setting, to cause the temperature of the upper surface to rise at approximately the same rate, and to the same extent, as the temperature of the lower surface is raised by the heat of the table.

While this heating of the upper surface of the blank may be done in a number of different ways, on or off of the tables, a preferred form of apparatus for heating the blanks on the tables is shown in Fig. 1 which comprises a steam pan 18 mounted above the tables and in close proximity to the upper surface of the blanks 13 carried thereby. The pan may be carried by a pair of angle irons 19 and 20 which run along opposite sides of the pan and are supported at their ends by angle iron frames 21 and 22 mounted on the floor at either side of the line.

As shown, the pan 18 is in the form of relatively thin, hollow, rectangular sheet metal casing, the interior of which is divided into a series of compartments 23, 24, 25, 26 and 27 (Fig. 3) by laterally extending partition walls 28.

Leading into the top wall of each of the compartments 23, 24, 25, 26 and 27, substantially centrally thereof, are steam pipes 29, 30, 31, 32 and 33 respectively, all of which are connected to a common manifold conduit 34 (as best shown in Fig. 5), leading from a source of steam supply (not shown). The bottom surface of the heating or steaming pan 18 is provided with double rows of openings 36 and 37 (Fig. 4) through which steam and condensate can emerge from the several compartments of the pan, and the top surface of the pan is covered with insulation 38.

The double rows of openings 36 and 37 in the bottom of the steam pan 18 are preferably positioned to run along opposite sides of the longitudinal center line of the pan so that they will not be directly below the supply pipes 29 to 33 to the compartments 23 to 27. The openings are also arranged inwardly of the longitudinal edges of the pan 18 to insure the steam emerging therefrom being maintained in contact with the glass by the pan, which acts as a baffle or trap to insure the steam moving over and in contact with a substantial area of the glass surface before it can escape from the space between the glass and the pan.

With this arrangement, the heating of the surfaces of the blanks 13 is accomplished primarily by the steam which flows from the openings 36 and 37 into contact with the glass surface and gives up heat as it condenses thereon. By proper regulation of the steam supply to the pan, in a manner to be hereinafter explained, practically all of the steam flowing from the openings 36 and 37 will condense on the glass beneath the pan so that little or no steam will escape around the edges of the pan.

Of course other means of heating the top surfaces of the blanks 13 may be employed. In fact, any source of heat of a character that is readily absorbed by a surface layer of the glass is satisfactory. However, with electrical or other forms of radiated heat, "dark" electric heaters, that is, heaters radiating wavelengths of greater than about 4 microns, must be used because the bright type of heaters emit shorter rays that would be transmitted through the glass and would act to increase the temperature of the table top and consequently of the lower surface of the blank. This would accentuate rather than reduce the curling of the glass.

Because dark electrical heaters are low temperature heaters, and so would require greater heating area, and make it difficult to properly heat the top surface of the glass blanks before the plaster has become set, we prefer to use a quicker type of heating. It will be apparent that the pan 18 will direct some radiant heat toward the glass, but this will be radiations that are substantially all beyond 4 microns with the maximum energy being applied at about 28.9 microns, and only serves to supplement the steam heating.

Figure 2:
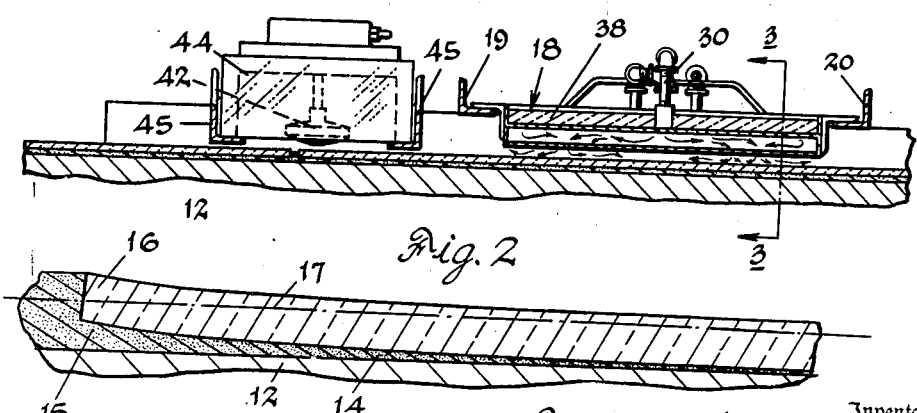
Fig. 2 is a fragmentary sectional view taken substantially along the line 2—2 of Fig. 1, showing the heating and heat control means in position above the glass blanks on the line.

In order to control the amount of steam fed to each of the compartments 23 to 27 of the pan 18, and so control the heating of the upper surfaces of the glass blanks 13, a hand valve 39 is provided in each of the pipes 29 to 33. In addition, there is interposed in the pipes 29 and 33 leading to the end compartments 23 and 27, thermostatically controlled valves 40 and 41 respectively. For the purpose of providing a more accurate control of the heating of the blanks along the edges thereof, where greatest curling of the blank occurs, there is provided a pair of collapsible, disc bellows type thermostats 42 and 43 which are positioned above and in close proximity to the top surface of the glass adjacent the side edges thereof (Figs. 1 and 2).

The thermostats 42 and 43 are preferably mounted within sheet metal casings 44 having open bottoms, and the casings are carried by a pair of angle irons 45 running along either side thereof and supported at their ends on the frames 21 and 22. The angle irons 45 are adjustable along the frames 21 and 22 to move the casings 44, with the thermostats 42 and 43 therein, toward and away from the steam heating pan 18, by slots 46 in the frame through which bolts 47 pass to secure the angle irons to the frames.

In operation, as best shown in Fig. 5, the thermostats 42 and 43, which are interposed in branch lines 48 and 49 respectively of a main line 50, leading from a source of compressed air (not shown) will be actuated by the temperature of the marginal portions of the blanks 13 passing therebeneath to regulate the amount of compressed air fed to the thermostatically controlled valves 40 and 41 in the pipes 29 and 33 respectively; and in this way will very accurately control the amount of steam fed to the two end compartments 23 and 27 of the pan 18, and insure the margins of the glass being heated to the desired point.

Generally speaking, the heating of the middle area of the blank can be sufficiently accurately controlled by careful setting of the hand valves 39, and in some cases the heating of the middle portion of the blanks will not be necessary at all, so that the supply of steam to the compartments 24 to 26 can be entirely shut off. On the other hand, thermostats similar to thermostats 42 and 43 may be provided to control thermostatically operated valves which may be interposed in the pipes 30 to 32 to provide extremely accurately controlled heating of the middle portion of the blanks as well as the marginal side portions.

It will be apparent that types of thermostats, other than the disc bellows type specifically shown and described, can be employed; and that the thermostats can be placed beyond as well as in advance of the heating pan, to accurately control the glass temperature, if desired.

In fact, it is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In a method of grinding and polishing glass in which a relatively cool glass blank is bedded in wet plaster on a heated table and then has its upper surface ground and polished after the plaster has set and while the blank is so bedded, the steps of applying wet plaster to said table, bedding said blank in said plaster, and heating the upper surface of said blank to provide equalized thermal conditions on the affected sides of the glass before said wet plaster has set.

2. In a method of grinding and polishing glass in which a relatively cool glass blank is bedded in wet plaster on a heated table and then has its upper surface ground and polished after the plaster has set and while the blank is so bedded, the steps of applying wet plaster to said table, bedding said blank in said plaster, and heating the upper surface of said blank from a heat source above the blank to provide equalized thermal conditions on the affected sides of the glass after the blank has been bedded in the wet plaster and before the plaster has set.

3. In a method of grinding and polishing glass in which a relatively cool glass blank is bedded in wet plaster on a heated table and then has its upper surface ground and polished after the plaster has set and while the blank is so bedded, the steps of applying wet plaster to said table, bedding said blank in said plaster, and heating at least two marginal portions of the upper surface of said blank to substantially the same extent as the corresponding portions of the lower surface of the blank are heated by contact with the heated table to provide equalized thermal conditions on the affected sides of the glass after said blank has been bedded in the wet plaster and before the plaster has set.

4. In a method of grinding and polishing glass in which a relatively cool glass blank is bedded in wet plaster on a heated table and then has its upper surface ground and polished after the plaster has set and while the blank is so bedded, the steps of applying wet plaster to said table, bedding said blank in said plaster, and heating at least two marginal portions of the surface of said blank at substantially the same rate and to substantially the same extent as the corresponding portions of the lower surface of the blank are heated by contact with the heated table to provide equalized thermal conditions on the affected sides of the glass after said blank has been embedded in the wet plaster and before said plaster has set up.

5. In a method of grinding and polishing glass in which a relatively cool glass blank is bedded in wet plaster on a heated table and then has its upper surface ground and polished after the plaster has set and while the blank is so bedded, the step of heating the upper surface of said blank by steam directed toward said surface from above to provide equalized thermal conditions on the affected sides of the glass after the blank has been bedded in the wet plaster and before said plaster has set up.

6. In a method of grinding and polishing glass in which a relatively cool glass blank is bedded in wet plaster on a heated table and then has its upper surface ground and polished after the plaster has set and while the blank is so bedded, the step of heating the upper surface of said blank by steam and dark radiated heat directed toward said surface from above after the blank has been bedded in the wet plaster and before said plaster has set up.

7. In a method of grinding and polishing glass in which a relatively cool glass blank is bedded in wet plaster on a heated table and then has its upper surface ground and polished after the plaster has set and while the blank is so bedded, the step of heating the upper surface of said blank by the condensation of steam applied to said surface to provide equalized thermal conditions on the affected sides of the glass after the blank has been bedded in the wet plaster and before said plaster has set up.

8. In a method of grinding and polishing glass in which a relatively cool glass blank is bedded in wet plaster on a heated table and then has its upper surface ground and polished after the plaster has set and while the blank is so bedded, the step of heating the upper surface of said blank by the condensation of steam applied to said surface beneath a baffle to provide equalized thermal conditions on the affected sides of the glass after the blank has been bedded in the wet plaster and before said plaster has set up.

9. In apparatus for grinding and polishing glass, the combination with a table on which a glass blank to be ground and polished is laid; of a hollow casing having its interior divided into a series of compartments mounted above said table and having openings in the bottom wall thereof, means connected to said casing and communicating with said compartments for supplying steam thereto, and means associated with the steam supplying means for controlling the amount of steam supplied to each compartment, whereby said steam will be forced from said compartments through said openings and into contact with the top surface of a glass blank on said table to heat the same uniformly over the area contacted by said steam.

10. In apparatus for grinding and polishing glass, the combination with a line including a series of abutting tables, means engageable with said tables for continuously moving the same and a laying yard through which said tables pass and wherein glass blanks are adapted to be laid on said tables; of a hollow casing mounted above said tables adjacent the end of said laying yard and extending from one side of the line to the other and having openings in the bottom wall thereof, partition walls running parallel with said line within said casing and dividing the interior thereof into a series of compartments, separate conduits connected to said casing for supplying steam to each of said compartments, thermostatically operable means in two of said conduits for regulating the amount of steam supplied to the two end compartments, thermostats operatively connected to said regulating means and mounted above the line adjacent the opposite sides of the table in close proximity to the surface of the glass blanks carried thereby at a point in advance of said casing, whereby steam will be forced from said compartments through said opening in the bottom of the casing and into contact with the top surface of the glass blanks on said tables to heat the same, and the amount of steam fed to the two end compartments will be controlled by the temperature of the marginal portions of the glass blanks as they move toward said casing.

11. In a method of grinding and polishing glass in which a relatively cool glass blank is bedded in wet plaster on a heated table and then has its upper surface ground and polished after the plaster has set and while the blank is so bedded, the step of heating the upper surface of said blank by radiant energy having wave lengths longer than 4 microns directed toward said surface from above after the blank has been bedded in the wet plaster and before said plaster has set up.

DONALD W. DUNIPACE.
IVAL G. FOWLER.

References Cited in the file of this patent

UNITED STATES PATENTS

| Number | Name | Date |
| --- | --- | --- |
| 694,711 | Anderson | Mar. 4, 1902 |
| 1,367,049 | Jackman | Feb. 1, 1921 |
| 1,872,697 | Drake | Aug. 23, 1932 |
| 1,959,225 | Wilhelm et al. | May 15, 1934 |
| 2,282,942 | Crowe | May 12, 1942 |
| 2,339,158 | Drake | Jan. 11, 1944 |
| 2,363,631 | Walters | Nov. 28, 1944 |

FOREIGN PATENTS

| Number | Country | Date |
| --- | --- | --- |
| 441,017 | Great Britain | Jan. 10, 1936 |
| 454,697 | Great Britain | Oct. 6, 1936 |